United States Patent [19]

Travnicek

[11] 4,165,158
[45] Aug. 21, 1979

[54] CAST CONTACT LENSES AND METHOD FOR MAKING SAME

[75] Inventor: Edward A. Travnicek, Southbridge, Mass.

[73] Assignee: American Optical Corporation, Southbridge, Mass.

[21] Appl. No.: 818,491

[22] Filed: Jul. 25, 1977

[51] Int. Cl.² ............................................. G02C 7/04
[52] U.S. Cl. ................................... 351/160 H; 264/1
[58] Field of Search ................ 351/160, 160 H; 264/1

[56] References Cited

U.S. PATENT DOCUMENTS

| | | | |
|---|---|---|---|
| 3,187,338 | 6/1965 | Neefe | 351/160 |
| 3,691,263 | 9/1972 | Stoy et al. | 351/160 H X |
| 3,761,208 | 9/1973 | Boudet et al. | 425/808 X |
| 3,781,096 | 12/1973 | Townsley | 351/160 UX |
| 3,915,609 | 10/1975 | Robinson | 351/160 X |
| 4,103,992 | 8/1978 | Breger et al. | 351/160 |

OTHER PUBLICATIONS

Mandel, R. B., "The Calculation of Contact Lens Edge Thickness," Optometric Weekly; vol. 55, No. 3 (1-1-6-64); pp. 19-21.

Mandel, R. B., Contact Lens Practice: Hard and Flexible Lenses, pp. 381-382.
Journal of the American Optometric Association, Mar. 1976, p. 274 (advert.).

Primary Examiner—John K. Corbin
Assistant Examiner—Scott J. Sugarman
Attorney, Agent, or Firm—Jeremiah J. Duggan; Alan H. Spencer; Stephen A. Schneeberger

[57] ABSTRACT

Casting a contact lens directly to finished size, shape and edge configuration. Casting is accomplished between concave and convex mold halves which respectively provide lens front and base curve forming surfaces. The rim of the concave front-forming surface is circular and makes continuous line contact with a spherical surface extended annularly about the convex base curve-forming surface to produce a vanishing thin edge without flashing about the cast lens. Provision is made for modification of the cross-sectional configuration of the circular rim and/or annular mold surface according to changes in lens edge profile needed to meet particular requirements for optimum lens fitting comfort.

6 Claims, 28 Drawing Figures

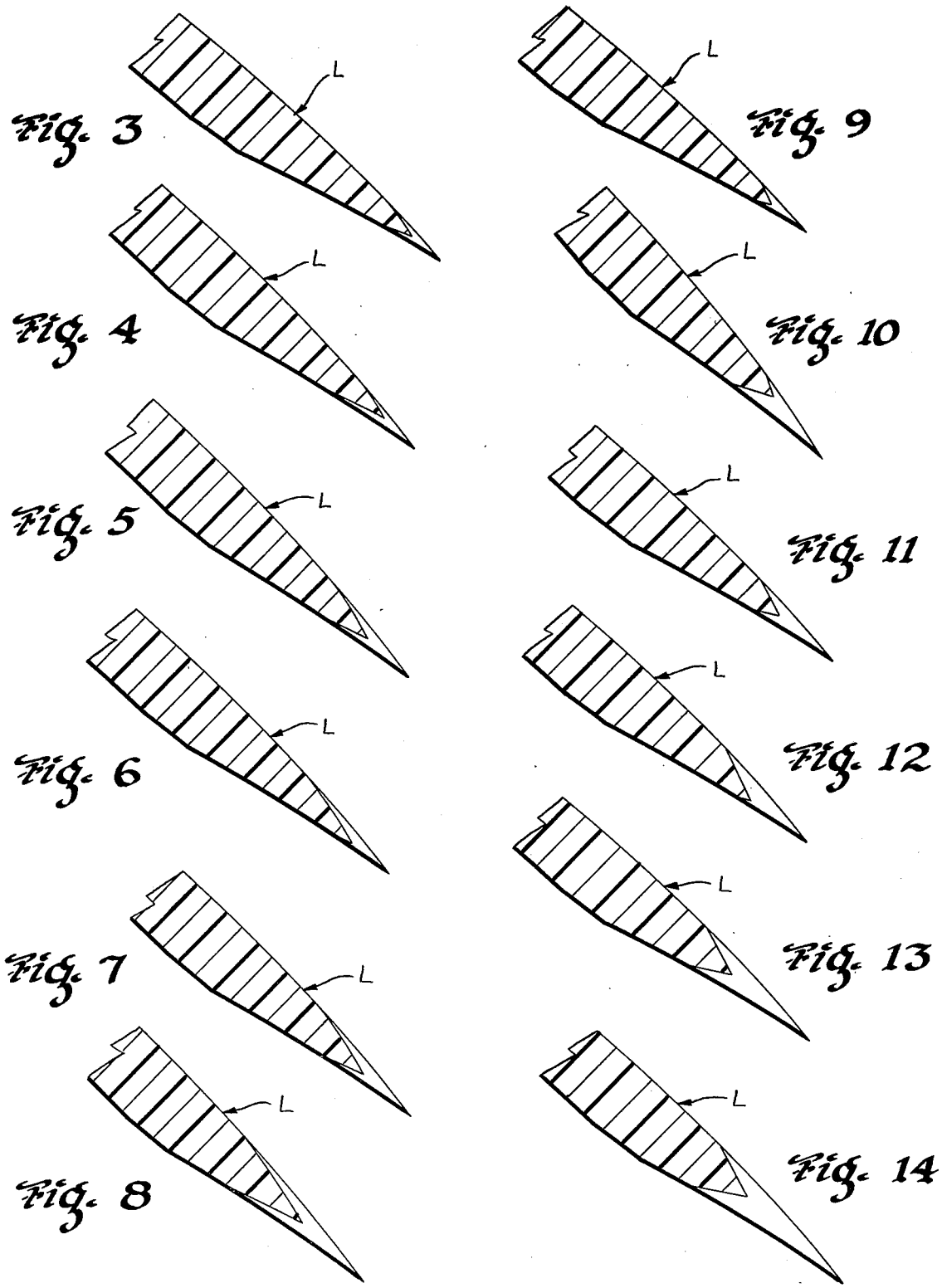

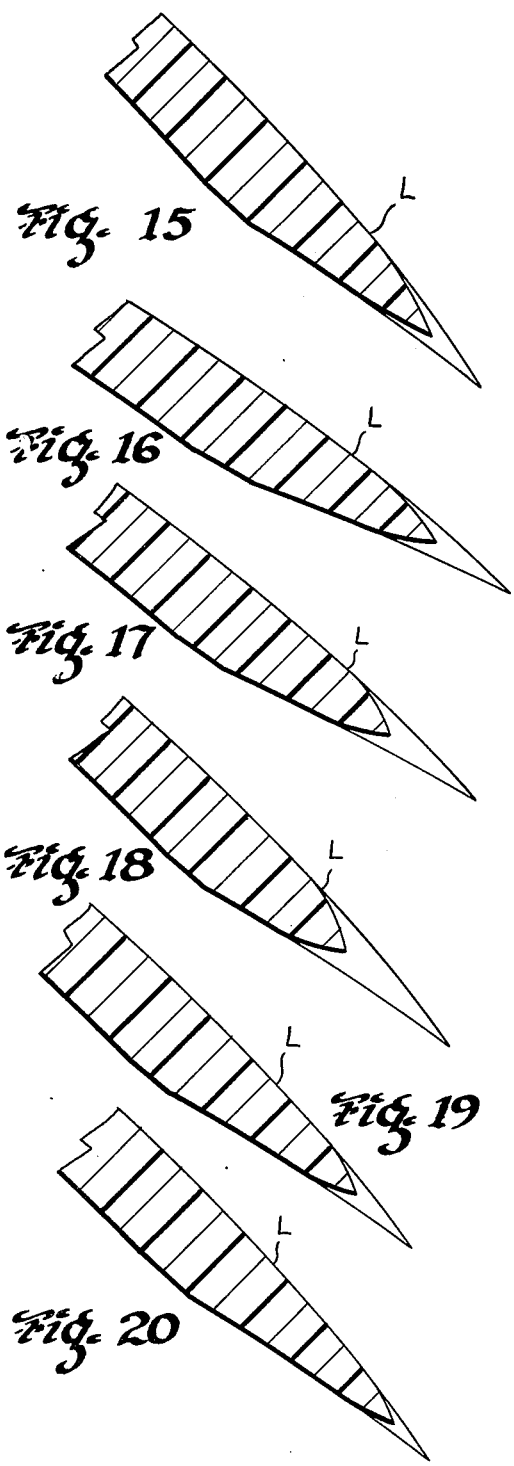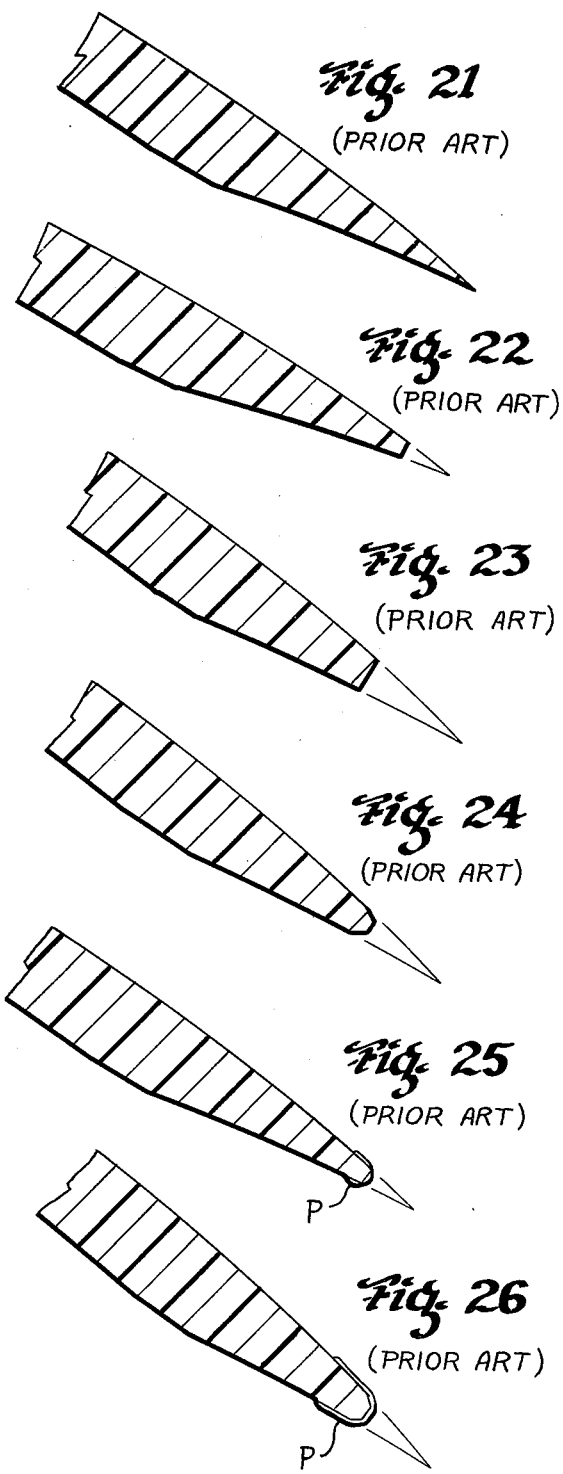

CAST CONTACT LENSES AND METHOD FOR MAKING SAME

BACKGROUND OF THE INVENTION

1. Field of the Invention

This invention relates to contact lenses and has particular reference to apparatus and method for casting the lenses to finished size, shape and desired edge configuration in a single operation.

2. Discussion of the Prior Art

In the manufacture of "soft" contact lenses, e.g. of cast silicon resin, edge finishing ordinarily consumes a very high percentage of the total labor required to make and inspect each lens. Edge finishing includes all operations involved in sizing a lens to desired diameter, contouring the edge to a comfortable shape and polishing or otherwise smoothing its surfaces. Prior art finishing equipment can be expected to cost more than half the total equipment cost (molds excepted) and occupy as much or more than half of the total manufacturing floor space with as much as three-quarters of the quantity yield losses for an entire lens manufacturing operation being attributed to the group of edge finishing steps. Additionally, the quality of contour and finish of the best of prior art edge finished lenses is usually considered only fair.

The disclosures of U.S. Pat. Nos. 2,990,664; 3,087,284; 3,160,039; 3,162,985; 3,369,329; 3,423,886; 3,458,959; 3,528,326; 3,835,590 and 3,948,007 are exemplary of lens edge finishing procedures and apparatuses.

Centrifugal casting technique, e.g. as in U.S. Pat. Nos. 3,408,429; 3,660,545 and 3,496,254 have been used with the objective, among others, of avoiding lens material shrinkage problems in the forming of thin edged lenses. The spin cast lens edge, however, becomes the edge of the posterior or concave surface of the lens. This surface is formed as a result of centrifugal forces, surface tension of the polymerizing lens material and other factors such as mold size and shape, volume, viscosity and volatility of the polymerizing mixture, condition of the mold surface, etc. The resulting surface accordingly becomes not only approximately parabolic in shape but very difficult to control and reproduce. There being no truly spherical optical zone and optimum optical quality is lacking. Also, post-polymerization edge finishing is usually required.

While lens edges requiring a minimum of finishing have been formed in systems which produce desirable lens surface profiles, e.g. as in U.S. Pat. Nos. 3,761,208; 3,915,609 and 4,017,238, parting lines between mold halves form the edges in locations which are subject to causing patient discomfort. For example, in the three-piece mold of U.S. Pat. No. 3,761,208 (FIGS. 1-6), two parting lines result at opposite sides of the cast lens edge. One would rest against the cornea and the other be engaged by the eyelid in use of the lens. These parting lines are very difficult and unduly costly to blend to the extent necessary for overcoming patient discomfort, especially in quantity production. On the other hand, the two-piece mold of U.S. Pat. No. 3,761,208 (FIG. 7) would inherently produce an edge flange requiring removal, e.g. by one or another of the aforesaid edge finishing procedures. It would be difficult for production quantities to obtain precise alignment of the mold halves in FIG. 7 of U.S. Pat. Nos. 3,761,208 so as to not produce a step at the parting line.

In the embodiments of U.S. Pat. Nos. 3,915,609 and 4,017,238, the sharp edge contact between a circular margin of one mold half and a spherically curved peripheral portion of the other mold half can minimize, if not eliminate, the need for most edge finishing operations. However, the mold parting lines may cause the cast lens edges to be located at positions and to extents tending to cause patient discomfort.

The foregoing comments illustrate the need in the present art for elimination of conventional costly and relatively ineffectual edge finishing operations and especially the need for improved lens edge design as well as apparatus and method all for accomplishing enhanced contact lens wearing comfort.

It is, accordingly, a principal object of the invention to provide a cast contact lens of improved edge design as well as apparatus and method of making the same.

A more specific object is to provide a contact lens which may be cast between separable mold halves having a single continuous mold parting line about the periphery of the lens casting cavity in a position relative to the cast lens edge which will lie between the eyelid and cornea and not rub on either when the lens is worn.

A corrollary objective is that of preventing occurrences of mold parting line blemishing or marking of cast contact lens edges at positions subject to engaging either the cornea or eyelid when the lenses are worn and further providing for modification of lens edge profile as needed to meet these particular requirements in various lens fitting situations.

The foregoing and other objects and advantages of the invention will become apparent from the following description.

SUMMARY OF THE INVENTION

According to the present invention, a "soft" contact lens e.g. of cast silicone resin, may be formed in a single operation without need for subsequent edge finishing and further with a single mold parting line so located at the lens periphery as to not rub on either the eyelid or cornea when the lens is worn but lie between them.

It is contemplated that a vanishing thin edge be produced without flashing and that its contour and finish be of high quality. This is accomplished with a pair of mold halves, one concave and the other convex, for producing lens front and posterior base curve forming surfaces respectively. The rim of the concave front forming surface is circular and makes continuous line contact with a spherically curved peripheral portion of the convex base curve forming surface. The precise location of this line of contact, i.e. the mold parting line, may be adjusted as desired by variation in the design of the mold cavity edge profile. Optimum positioning of mold parting line relative to a cast lens edge may be accomplished with a great variety of more or less sharp, blunt, rounded and other profiles according to the desires of the manufacturer, the fitting practitioner, the patient and/or others. It has been determined that the amount of rounding and taper toward the edge of the cast lens may be varied over a range of included angles of from approximately 20° to approximately 70°. Desirable lens edge profiles are depicted in the accompanying drawings.

The details of the invention will become more readily apparent from the following description when taken in conjunction with the drawings.

IN THE DRAWINGS

FIGS. 3-20 are diagrammatic illustrations of finished lens edge contours possible to achieve by the present casting technique;

Figure 27:
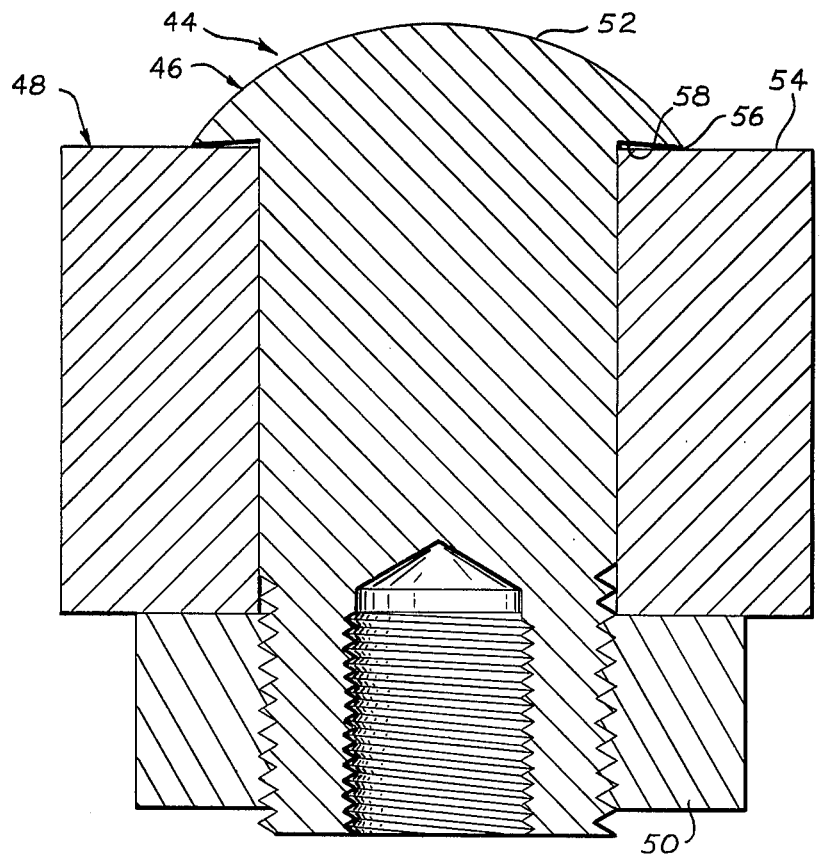
Figure 28:
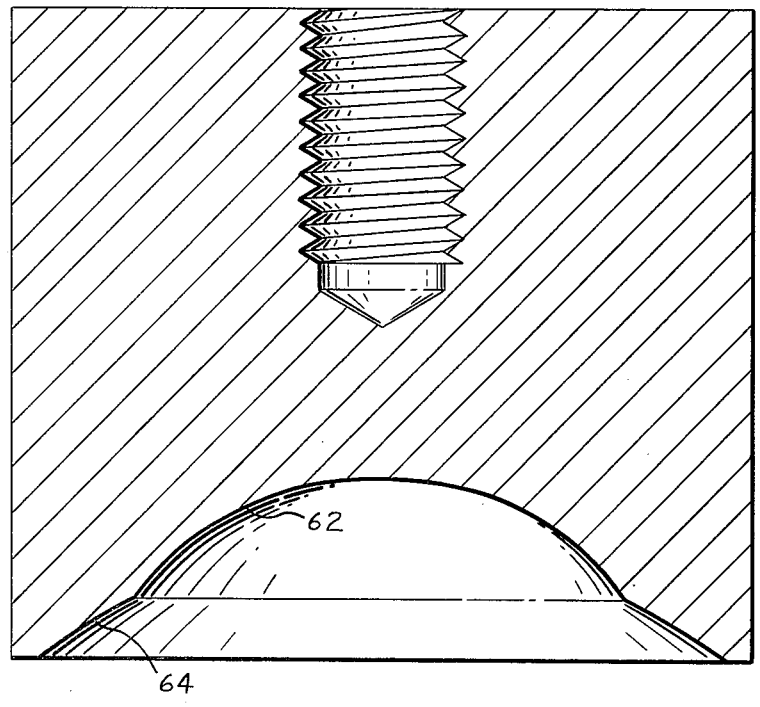

FIGS. 21-26 diagrammatically illustrate prior art lens edge profiles, some as they appear in finished form and others only partially finished; and FIGS. 27 and 28 illustrate details of tooling which may be used in the making of lens casting mold halves useful for practice of the invention.

DESCRIPTION OF THE PREFERRED EMBODIMENTS

Figure 1:
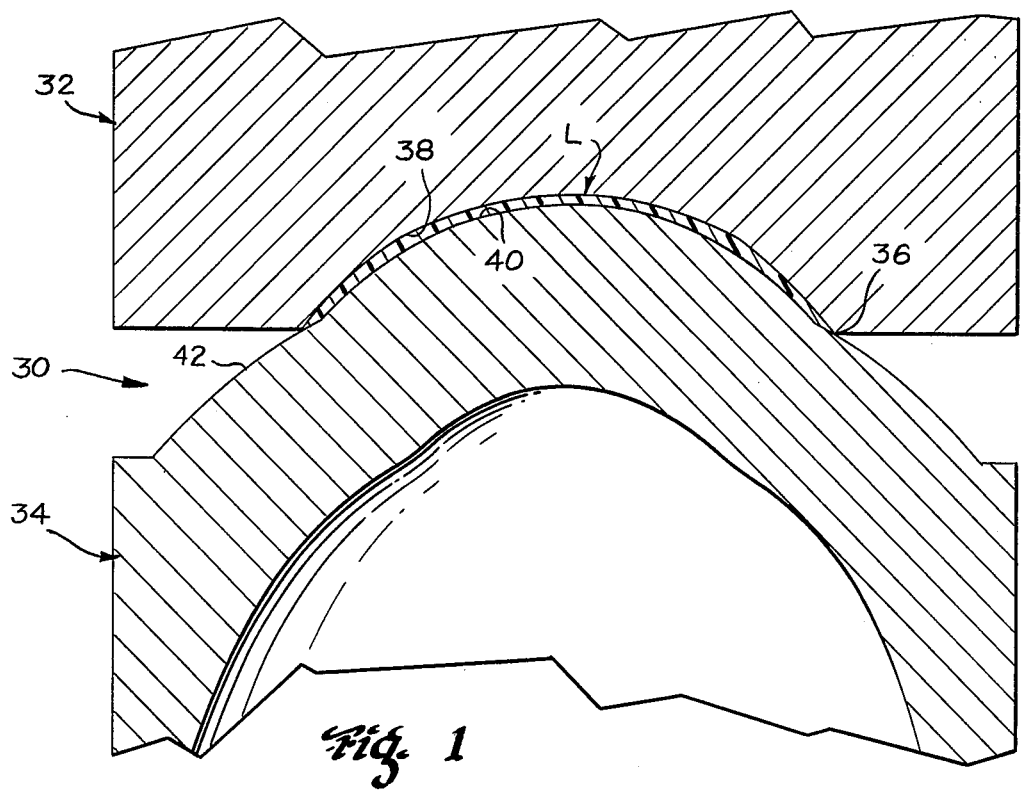
FIG. 1 illustrates, in cross-section, a preferred embodiment of mold apparatus for producing a cast contact lens according to the invention.

Referring more particularly to FIG. 1 of the drawings, mold 30 which is used to cast lens L comprises a pair of halves 32 and 34. These mold halves mate with a single line contact which will be referred to hereinafter as the mold parting line 36. Mold half 32 has concave casting surface 38 which is used to form the front convex surface of lens L and mold half 34 has convex casting surface 40 which is used to form the concave base curve of lens L.

The edge of concave casting surface 38 is circular and makes continuous line contact with the curved peripheral portion 42 of casting surface 40 which is, in all embodiments of this invention, spherical in shape so that mold halves 32 and 34 will be assured of mating with single line contact, i.e. parting line 36, whether perfectly axially aligned or not. The single parting line 36 provides a vanishing thin edge and no flashing around lens L.

While suitable materials for lenses to be cast according to the present invention may include most, if not all, of the various well known optical quality casting plastics or resins, an exemplary material is silicone rubber, i.e. a clear colorless dimethyl silicone resin typically having very little shrinkage associated with its cross-linking or vulcanization reaction. Details of contact lens casting compositions, their manner of preparation as casting precursors and curing procedures are well known in the art and will not be dealt with herein. The present invention is directed more particularly to novel lens and lens mold designs which overcome the above-mentioned drawbacks of prior art casting systems and their associated mold and lens geometries.

Figure 2:
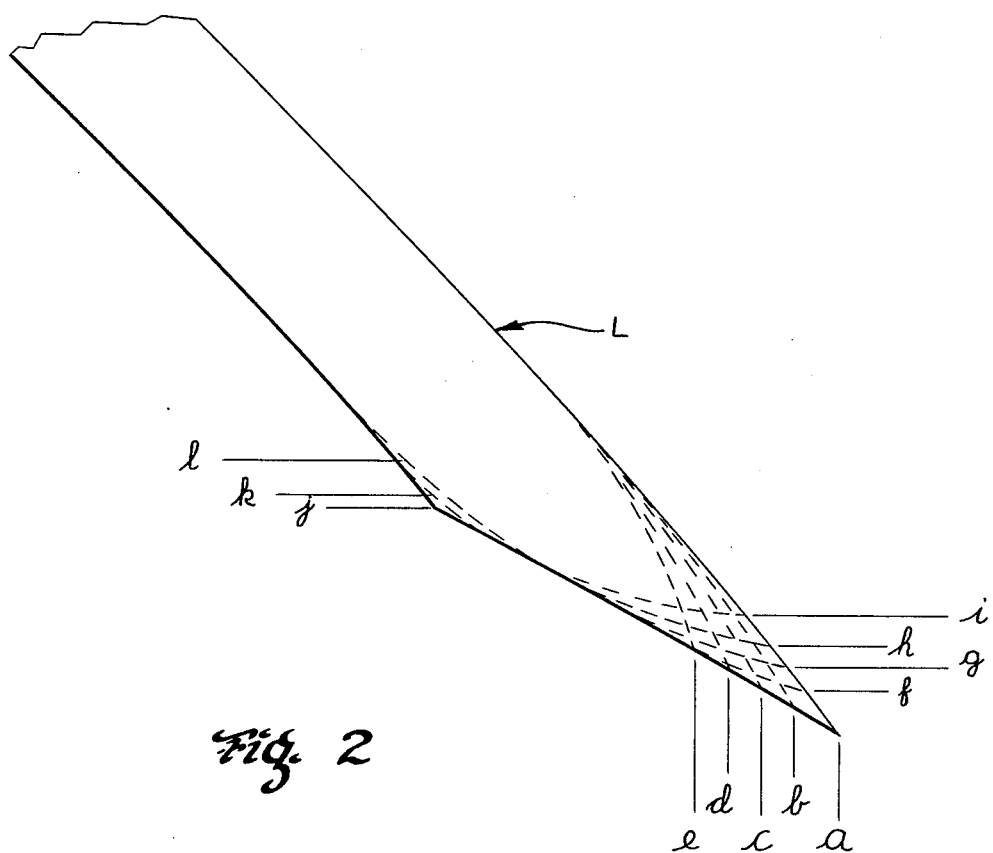
FIG. 2 is a greatly enlarged diagrammatic illustration of some of various cast lens edge profiles contemplated by the invention.

FIG. 2 is a greatly enlarged cross-sectional view of the edge of lens L diagrammatically demonstrating several different physically possible profiles which can be used to so position the mold parting line 36 at the cast edge of the lens L as to avoid its contact with either the cornea or eyelid when the lens is put to use. Cross-sectioning has been eliminated from FIG. 2 for ease and clarity of illustration.

It is to be understood that all reference made herein to the "mold parting line" is intended to refer to both the physical line of contact 36 between mold halves 32 and 34 and the location of inflection point at the very edge of a cast lens where the lens becomes shaped by the joining of mold halves 32 and 34, i.e. the point in a planar sense where there is juncture because of an abrupt change of lens surface curvature from its anterior surface to posterior surface or vice versa.

The lens edge profile in FIG. 2 which is formed by the outermost full lines of the figure and reproduced more clearly in FIG. 21 is a typical prior art configuration requiring edge finishing, i.e. reshaping by grinding, polishing and/or painting as illustrated in one or more of FIGS. 22-26.

Profiles created by combining any one of broken lines b, c, d, or e with respectively remaining full lines of FIG. 2 illustrate that a progressively blunter edge can be produced by modifying mold half 32 which forms the front or anterior surface of lens L. Profiles created by combining any one of broken lines f, g, h and i with respectively remaining full lines of FIG. 2 represent lens edge shapes possible to achieve by modification of the peripheral portion 42 of base curve mold half 34. The transition region between portion 42 and the adjoining curvature of casting surface 38 may be retained relatively sharp as illustrated by profile j or more rounded as shown by profiles k and l. Any of profiles a through e may be combined with profiles f through i and/or with profiles j through l.

Profiles which will locate the mold parting line intermediately of eyelid and cornea when the lens L is worn are, for example, combinations of b and f; c and f; b and g; d and f; c and g; b and h; d and g; c and h; b and i; d and h; e and g; e and h; d and i; and e and i. An optimum profile is approximately that of profile d and h with blending profile l.

FIGS. 3 through 20, while not all inclusive, illustrate actual lens edge profiles possible to achieve by the casting technique of the present invention. In each case, the mold parting line, i.e. extreme edge of the lens is so located as to avoid its direct contact with the eyelid or cornea and lie somewhere therebetween when the lens is worn. In each of FIGS. 3 through 20, cross-sectioning is used to emphasize the improved lens edge profile. Portions extended beyond the cross-sectioning illustrate, for comparison purposes, the heretofore usual or prior art cast lens profile, i.e. that of FIG. 21 and/or profile a of FIG. 2. This prior art profile requires reworking by grinding and polishing to shapes illustrated in FIGS. 22, 23 or 24 and thereafter "painting" as in FIGS. 25 and 26. The expression "painting" is intended to refer to the application of a covering layer P of the casting precursor and subsequently polymerizing or otherwise curing the same to effect relatively smooth surfacing of the lens edge.

In FIGS. 3 through 8 and FIG. 15, the edge profile is terminally provided with an approximately 30° included angle. The edge profiles shown in FIGS. 9 through 14 and FIG. 16 have an approaximate 50° included angle and the more blunt edges of FIGS. 17 through 20 are each provided with an approximately 70° included angle. Blending as shown by lines k and l of FIG. 2 is incorporated in some of these embodiments of the invention, e.g. those of FIGS. 3, 6, 8, 14, 17 and 18.

Tooling which may be used in the formation of mold halves 32 and 34 is illustrated in FIGS. 27 and 28 respectively. In each case, a forming tool or pattern is provided with a reverse curvature upon which the mold half casting surface may be molded, cast and/or electroformed. Electroforming is preferred wherein molds 32 and 34 may be provided with nickel surfaces 38 and 40 respectively.

Details of the process of electroforming will not be dealt with herein. Such details are well within the ordinary skill of the artisan and do not have particular pertinence to the crux of this invention beyond the present inventions provision of suitable mold making patterns.

In this latter respect, it is contemplated that the complex reverse curve configuration needed to form casting surface 38 be provided in the form of pattern 44 (FIG. 27).

Pattern 44 is of three-piece construction including a centrally disposed headed and terminally threaded main body member 46 fitted within a hollow cylindrical supporting member 48 and clamped in place with nut 50. Members 46 and 48 are preferably but not necessarily formed of stainless steel. Head 52 of member 46 is afforded, in reverse curvature, the desired shape of concave casting surface 38 and the edge 54 of supporting member 48 is formed to a flat. The junction 56 of head 52 with flat edge 54 forms the circular rim of concave casting surface 38, and establishes the location of mold parting line 36. The underside 58 of head 52 is relieved, i.e. undercut, to provide a tight fit and sharp corner at junction 56 so as to avoid any angles of negative draft and permit easy electroform separation. The curvature of peripheral portions of head 52, i.e. adjacent junction 56, may be modified as needed to produce any one of profiles a, b, c, d or e (FIG. 2).

Pattern 60 (FIG. 28) is typical of a contact lens base curve mold half forming tool. The configuration shown in FIG. 28 is but one of several similar patterns which may be used and/or modified as suggested in FIG. 2. Pattern 60 comprises a main body, e.g. of stainless steel, having surface 62 against which mold half 34 may be electroformed. As such, surface 62 is of reverse curvature to convex casting surface 40 of mold half 34. Modification of curvature 64 which is the reverse of curvature 42 (FIG. 1) may be made as needed to produce any one of profiles a, f, g, h or i and/or k and l (FIG. 2).

Those skilled in the art will readily appreciate that there are various other modifications and adaptations of the precise forms of the invention here shown which may suit particular requirements. Accordingly, the foregoing illustrations are not to be interpreted as restrictive beyond the extent necessitated by the following claims.

I claim:

1. A cast and otherwise unworked finished corneal contact lens comprising:

a meniscus body of ophthalmic lens material having a vanishing thin edge without flashing, the inflection point of said edge being along a single line located intermediately of adjacent portions of oppositely disposed convex exterior and concave interior surfaces of said body, said inflection point specifically being in such position as to lie between the eyelid and cornea of an eye receiving the lens and out of engagement with either when the lens is worn and said lens requiring no further finishing.

2. A cast lens according to claim 1 wherein the included angle between said oppositely disposed exterior and interior surfaces at a location adjacent said inflection point is within the range of from approximately 30° to 70°.

3. A cast lens according to claim 1 wherein a marginal portion of said interior surface is of a radius of curvature differing from the remaining portion of said surface and is blended with said remaining portion by means of an intermediate surface of different curvature than that of either of said portions.

4. The method of casting a contact lens between a pair of mold halves of a casting system comprising the steps of:

placing an excess of casting precursor in a concave mold cavity of a first mold half having the curved configuration desired of the outermost convex side of the cast lens, said cavity further having a line-like circular edge establishing the mold parting line of the casting system;

placing over said first mold half and against said casting precursor a second convex mold half having the curved configuration desired of the intermost concave side of the cast lens, said curved configuration including a spherical marginal portion; and causing said marginal portion to engage said circular edge of said first mold half with said mold halves in substantial alignment to form a closed casting cavity having a parting line intermediately of adjacent portions of said concave and convex casting surface and forcing out the excess of casting precursor.

5. A method according to claim 4 wherein said casting precursor in said closed cavity is at least partially cured, said mild halves are separated and said cured precursor is removed as said cast lens.

6. The product of the process of claim 5.

* * * * *